United States Patent
Worthington

(10) Patent No.: US 10,974,325 B1
(45) Date of Patent: Apr. 13, 2021

(54) METHOD AND APPARATUS FOR RETAINING A TOOL IN A TOOL HOLDER

(71) Applicant: Techniks, LLC, Indianapolis, IN (US)

(72) Inventor: Scott Worthington, Flat Rock, IN (US)

(73) Assignee: TECHNIKS, LLC, Indianapolis, IN (US)

( * ) Notice: Subject to any disclaimer, the term of this patent is extended or adjusted under 35 U.S.C. 154(b) by 0 days.

(21) Appl. No.: 16/553,469

(22) Filed: Aug. 28, 2019

Related U.S. Application Data

(62) Division of application No. 15/972,607, filed on May 7, 2018, now Pat. No. 10,464,140.

(51) Int. Cl.
| | | |
|---|---|---|
| *B23B 31/117* | (2006.01) | |
| *B23P 11/02* | (2006.01) | |
| *B23B 31/00* | (2006.01) | |
| *B05D 5/02* | (2006.01) | |

(52) U.S. Cl.
CPC ............ *B23B 31/1179* (2013.01); *B05D 5/02* (2013.01); *B23B 31/008* (2013.01); *B23P 11/027* (2013.01); *B23B 2231/2037* (2013.01); *B23B 2240/28* (2013.01); *Y10T 279/17957* (2015.01); *Y10T 409/30952* (2015.01)

(58) Field of Classification Search
CPC .............. B23B 31/008; B23B 31/1179; B23B 2231/2037; B23B 2240/28; B23P 11/027; B05D 5/02; Y10T 279/17957; Y10T 279/17982; Y10T 409/30952
See application file for complete search history.

(56) References Cited

U.S. PATENT DOCUMENTS

| | | |
|---|---|---|
| 4,125,637 A | 11/1978 | Tanner |
| 4,886,304 A | 12/1989 | Kunsman |
| 5,024,126 A | 6/1991 | Holland-Letz et al. |
| 5,197,720 A | 3/1993 | Renz et al. |
| 5,340,128 A | 8/1994 | Weiss et al. |
| 5,601,295 A | 2/1997 | Baker |
| 5,997,012 A | 12/1999 | Brian |
| 6,315,506 B1 | 11/2001 | Mizoguchi |
| 6,740,355 B2 | 5/2004 | Thiemann |
| 7,959,387 B2 * | 6/2011 | Frota de Souza ...... B23B 31/02 409/234 |
| 10,022,806 B2 | 7/2018 | Langbein et al. |
| 2002/0139680 A1 | 10/2002 | George |
| 2005/0244582 A1 | 11/2005 | Weihrauch |
| 2006/0246275 A1 | 11/2006 | Dumm et al. |
| 2013/0328275 A1 | 12/2013 | Haimer |
| 2016/0158847 A1 | 6/2016 | Popp et al. |

FOREIGN PATENT DOCUMENTS

| | | | | |
|---|---|---|---|---|
| DE | 102009018813 A1 * | 10/2010 | ........... | C23C 30/005 |
| JP | S5419282 A | 2/1979 | | |
| JP | 02076608 A * | 3/1990 | ........... | B23B 31/117 |

* cited by examiner

*Primary Examiner* — Eric A. Gates
(74) *Attorney, Agent, or Firm* — Shuttleworth & Ingersoll, PLC; Jason R. Sytsma

(57) ABSTRACT

Tool holder has a first section adapted to be connected to a machining center and a tool holding section comprising a bore with a surface defining an inner diameter of the bore. Dispersed around the surface of the bore and at least partially embedded in the surface of the bore is a joining compound having a Young's modulus greater than a Young's modulus of the surface of the bore.

17 Claims, 10 Drawing Sheets

METHOD AND APPARATUS FOR RETAINING A TOOL IN A TOOL HOLDER

This application is a division of U.S. patent application Ser. No. 15/972,607 filed May 7, 2018, the contents of which are hereby incorporated by reference.

TECHNICAL FIELD

This disclosure relates to a shrink-fit tool holder, and more specifically, this disclosure relates to a method and apparatus for retaining a tool in a shrink-fit tool holder by embedding a joining compound in the bore of the tool holder to mechanically lock the tool to the tool holder.

BACKGROUND INFORMATION

A machining center is a computer numerical control (CNC) machining tool with an automatic tool-changing function. The machining center can automatically perform various working such as milling, drilling or notching, boring, tapping, etc. on works set thereto with improved efficiency. A tool holder comprises generally of a tapered portion adapted to be connected to a spindle of a machining center, a manipulator-engaging portion, and a tool holding section for firmly holding the tool.

One type of tool holder is a shrink-fit tool holder, which can firmly hold a tool with excellent dynamic balancing suitable for high-speed work. The shrink-fit tool holder comprises of a tapered connecting portion, a manipulator-engaging portion, and a tool holding section for firmly holding a tool. A shank of the tool is inserted into an aperture of the tool holding section and secured by shrinkage fitting.

The conventional shrink-fit tool holders utilize differences in thermal expansion coefficients between the tool-holding sections and the tool shanks. The tool shanks are made of materials having low thermal expansion coefficients such as sintered carbides, high speed steel, etc., while the tool-holding sections are made of high-expansion materials such as hot work tool steel, nickel-chromium steel, etc.

In these prior art tool holders, the tool shank and the aperture of the tool-holding sections have suitably controlled sizes to achieve detachability, thereby minimizing heating for shrinkage fitting and thus preventing decrease in strength and hardness of materials due to change in their structures. However, in the conventional shrinkage-fit tool holders, the difference in a thermal expansion coefficient between the tool-holding member and the tool shank is insufficient, thereby failing to achieve a sufficient gripping strength.

Accordingly, there is a need for a method and apparatus for retaining a tool in a shrink-fit tool holder by embedding a joining compound in the bore of the tool holder to increase the coefficient of static friction between the tool holder and the tool.

SUMMARY

In accordance with one aspect of the present invention, a tool holder for holding a tool having a shank with an outer diameter is disclosed. The tool holder has a first section adapted to be connected to a machining center and a tool holding section comprising a bore with a surface defining an inner diameter of the bore. Dispersed around the surface of the bore and at least partially embedded in the surface of the bore is a joining compound having a Young's modulus greater than a Young's modulus of the surface of the bore. The joining compound comprising a particle size greater than or equal to the difference between the inner diameter of the bore and the outer diameter of the shank of the tool. In this regard, the joining compound can comprise a particle structure and can have a hardness greater than a hardness of the surface of the bore of the tool holding section of the tool holder. The joining compound can be selected from the group comprising diamond, aluminum oxide, silicon carbide, boron carbide, synthetic sapphire, garnet, cerium oxide, silica, and osmium.

An applicator is used to embed the joining compound into the surface of the bore of the tool holding section of the tool holder. The applicator has a Rockwell hardness greater than a Rockwell hardness of the surface of the bore of the tool holding section of the tool holder. The applicator is fixed temporarily in the bore of the tool holder with the surface of the bore in a state of stress from heating the tool holder to expand the bore and allowing the bore to cool onto the applicator which causes a forceful application of the joining compound into the surface of the bore.

In accordance with one aspect of the present invention, a method for manufacturing a tool holder is disclosed. The method involves changing temporarily an inner diameter of a bore of the tool holder from an initial diameter then applying with an applicator a joining compound on a surface of the bore. The method continues by leaving the applicator in the bore of the tool holder and fixing temporarily the applicator in the bore by allowing the inner diameter of the bore of the tool holder to return the initial diameter and mechanically lock the applicator to the bore of the tool holder. This causes an embedding of the joining compound into the surface of the bore during the step of fixing temporarily the applicator in the bore so that pressure between the surface of the bore and the applicator forces the joining compound into the surface of the bore. During the step of fixing temporarily the applicator in the bore, this can be more broadly described as clamping the inner diameter of the bore of the tool holder on to the applicator and mechanically lock the applicator to the bore of the tool holder. The step of fixing temporarily the applicator in the bore can include changing the temperature of the tool holder by heating the tool holder to expand the inner diameter of the bore.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
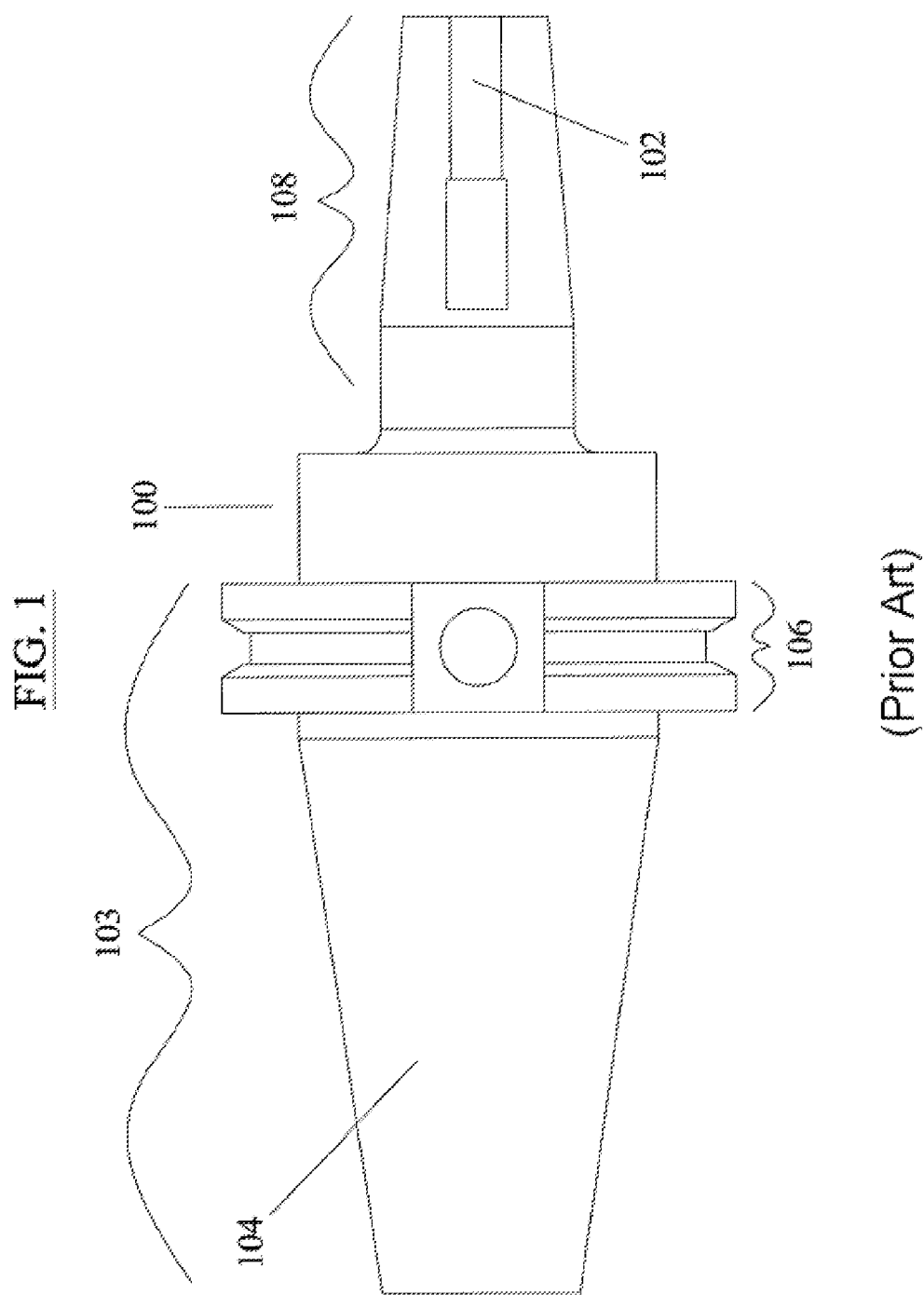
FIG. 1 is a partial cross-sectional side view of a tool holder with a shrink-fit bore according to the prior art.
Figure 2:
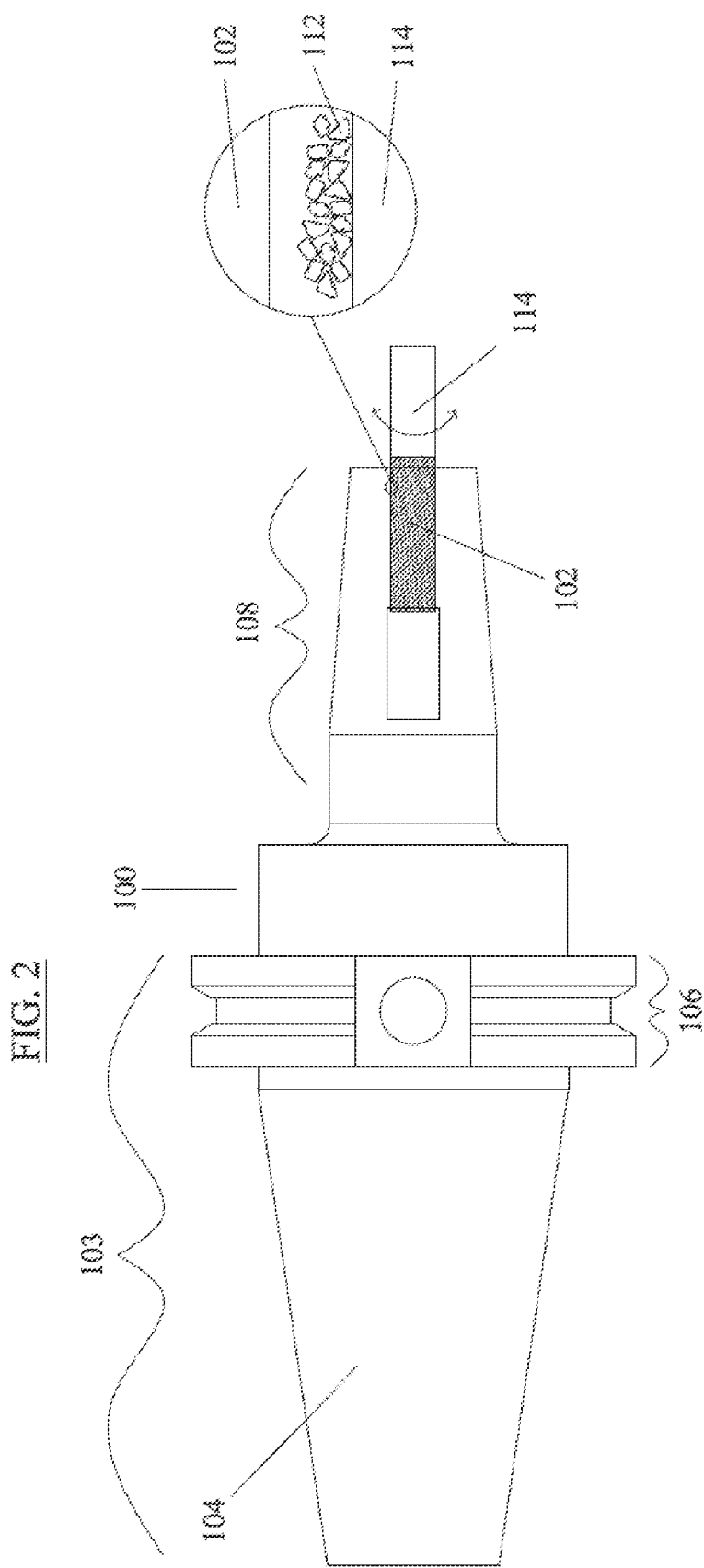
FIG. 2 is a partial cross-sectional side view of a tool holder according to this disclosure with the bore of the tool holder being embedded with a joining compound by a WC Rod.
Figure 4:
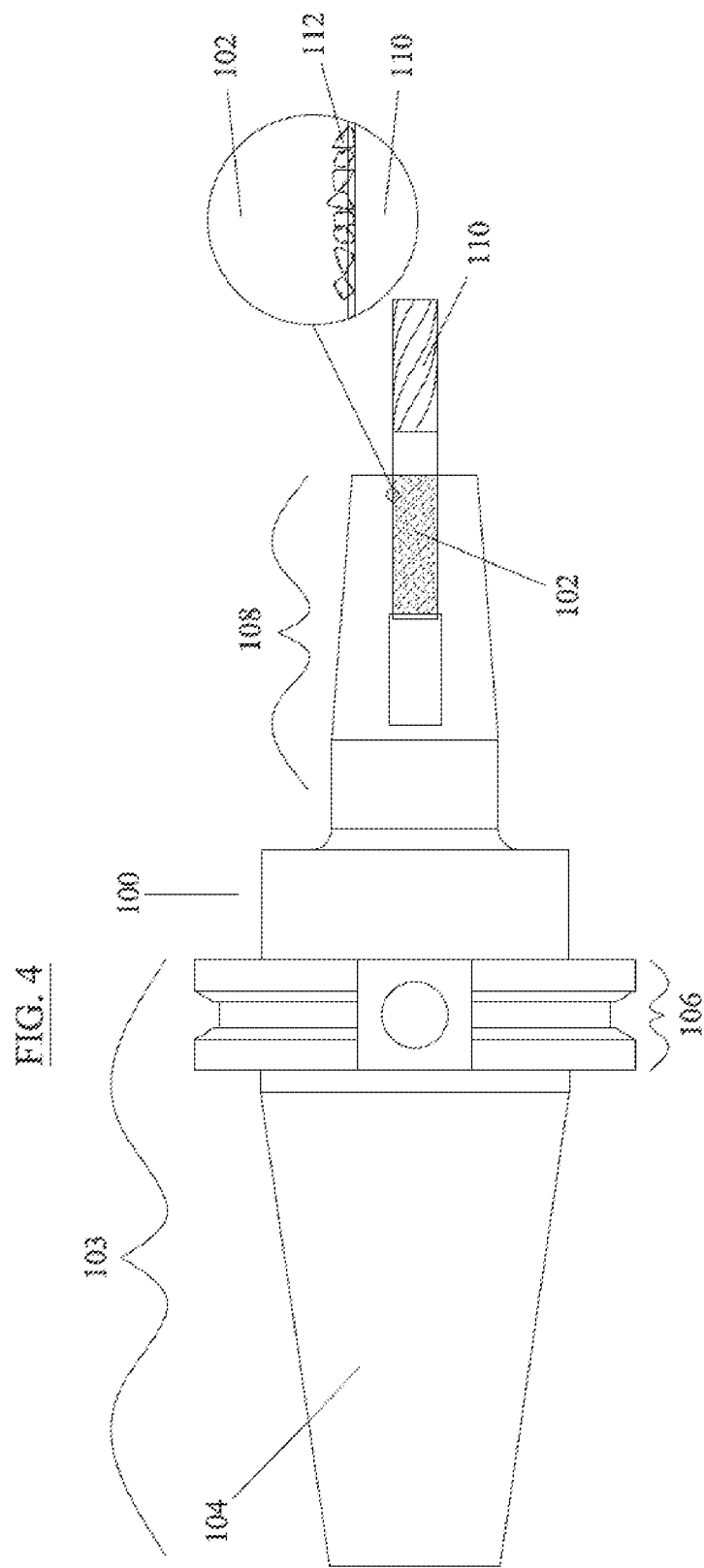
FIG. 4 is a partial cross-sectional side view of the tool holder of FIG. 1 with the bore of the tool holder embedded with the joining compound and fitted with a tool.

Referring to FIG. 1, disclosed is a tool holder 100 with a bore 102 that can be shrink-fit onto a tool according to the prior art. Tool holder 100 comprises of a first section 103 adapted to be connected to a machining center (CNC). This first section 103 can include a tapered connecting portion 104 configured to be received by a CNC machine (not shown) and a manipulator-engaging portion 106 is designed to be engaged by a clamping system in the CNC machine to hold firmly tool holder 100 to the CNC machine spindle. A tool holding section 108 can firmly hold a tool 110 (shown in FIG. 4) to the tool holder 100. A shank of the tool is inserted into bore 102 of tool holding section 108 and secured by shrink fitting.

This disclosure is directed to increase the coefficient of static friction between tool holder 100 and tool 110. The grip of the tool holder 100 is improved by impregnating bore 102 of tool holding section 108 with a joining compound 112. Joining compound 112 provides a mechanical lock of the shank of tool 110 by bore 102. For the purpose of this disclosure, joining compound 112 can comprise a crystalline particle structure like diamond or similarly hard aggregate like ceramic. A hard aggregate for the purpose of this disclosure means an aggregate or joining compound 112 with a Young's modulus greater than the Young's modulus of the material comprising tool holding section 108 of tool holder 100. Examples of hard aggregates include, for example, diamond, aluminum oxide, silicon carbide, boron carbide, synthetic sapphire, garnet, cerium oxide, silica, and osmium. Joining compound 112 can also be provided with the foregoing material included in a paste for ease of application. Through sufficient force, joining compound 112 is impregnated into bore 102.

In an embodiment, joining compound 112 is applied to an applicator 114.

Applicator 114 is preferably also made of a hard material. A hard material for the purpose of this disclosure with respect to applicator 114 means a material with a Young's modulus greater than the Young's modulus of the material comprising tool holding section 108 of tool holder 100. Materials fitting this description include, tungsten carbide (WC) rod, coated hardened steel rod, and ceramic rod. WC, for example, has a Young's modulus that is more than three times that of most of metals used in tool holding section 108 of tool holder 100.

Tool holding section 108 of tool holder 100 is heated to a sufficient temperature to expand bore 102. The amount of expansion need only be sufficient to receive the coated applicator 114. Applicator 114 with a coating of joining compound 112 is inserted into bore 102 and rotated back and forth to evenly distribute joining compound 112 around the surface of bore 102 before bore 102 cools enough to capture applicator 114. Tool holding section 108 is allowed to cool during this process. This fixes temporarily applicator 114 in bore 102 by allowing the inner diameter of bore 102 of tool holder 100 to attempt to return the initial diameter and mechanically lock applicator 114 to bore 102 of tool holder 100. This embeds joining compound 112 into the surface of bore 102 while the applicator 114 is fixed temporarily in bore 102 so that pressure between the surface of bore 102 and applicator 114 forces joining compound 112 into the surface of bore 102. By heating bore 102 less force is required to embed joining compound 112 into bore 102, however, other ways for embedding bore 102 with joining compound 112 will be discussed below.

The amount of joining compound 112 required on the surface of bore 102 can be approximated by applying a substantially even coating of joining compound 112 around the surface of bore 102. Another alternative is to do a microscopic optical comparison with a known properly impregnated bore 102. Another alternative is to closely monitor the amount of joining compound 112 used in each installation. This, however, can be difficult due to the extremely small size of the particles in joining compound 112. With appropriate testing a precise amount of joining compound 112 can be easily determined.

More specifically, in one implementation a paste with diamond particles for joining compound 112 is used. Diamond, for example, has a Young's modulus nearly 6 times that of most metals used for tool holding section 108 of tool holder 100. In this implementation, applicator 114 comprised of tungsten carbide (WC) is also used. In this instance, diamond particles are forced between applicator 114 and bore 102 of tool holder 100 which causes localized stress that exceeds the elasticity of metal in bore 102 and causes bore 102 to undergo plastic deformation, which allows bore 102 to be penetrated by joining compound 112 and for the metal surface of bore 102 to wrap at least partially around joining compound 112 conforming to shape of joining compound 112 (in this case to the diamond particles). When bore 102 cools, joining compound 112 is permanently fixed to the surface of bore 102.

One skilled in the art will know that with respect to shrink fit tool holders H13 (SKD61) is the most common metal used for production, although stainless steel is also commonly used. Shrink fit tool holders made from any metals with similar characteristics, however, will benefit from the addition of the joining compound 112 fixed to the surface of bore 102.

The type of joining compound 112 to use will depend on the type of material comprising tool holder 100 as well as the size of bore 102 of tool holder 100. The particle size for joining compound 112 can be in the 4-8 micron range (and any value in between) for bores 102 with an inner diameter under 0.25 inches. Joining compound 112 with particles size of 8-12 micron (and any value in between) can be used when bore 102 has an inner diameter larger than 0.25 inches. It has been found that joining compound 112 with larger particle sizes require too much heat to allow the particles to be inserted with applicator 114 into bore 102. The particle size of joining compound 112 should be equal to or larger than the difference between the largest inner diameter tolerance of bore 102 and the smallest shank outer diameter tolerance of tool 110. The following formula approximates the particle size for joining compound 112:

Particle size=>|upper bore i.d. tolerance|–|lower shank o.d. tolerance|

Furthermore, with even dispersion of the joining compound 112, there is no significant impact on the concentricity of bore 102 due to the small size of the particles and the small amount of each particle that protrudes from the surface of bore 102.

The surface of bore 102 can be impregnated or embedded with joining compound 112 in a number of different manners. The goal is to change temporarily the inner diameter of bore 102 of tool holder 100 from its initial diameter so that applicator 114 coated with joining compound 112 can be inserted into bore 102 and used to apply joining compound 112 around the surface of bore 102. As tool holding section 108 begins to cool, the inner diameter of bore 102 begins to shrink and return to its prior dimension. As the inner diameter shrinks, bore 102 begins to capture applicator 114. Joining compound 112 around the surface of bore 102 are mechanically forced into the surface of bore 102 because the surface of bore 102 has a Young's modulus less than the Young's modulus of joining compound 112 and applicator 114. For joining compound 112 comprising diamond, it has been found that the temperatures needed to impregnate the surface of bore 102 for the most common type of tool holding section 108 (i.e., H13) and an applicator 114 comprising WC are typically much less than 1000 degrees F. It should be noted that the diamond begins to break down at temperatures near 1300 degrees F. If the temperature of the diamond approaches this temperature, the diamond begins to chemically react with the material in tool holding section 108. This will eventually reduce the holding power of the diamond due to the reduction of the particle size of the diamonds.

While heating is the preferred method of embedding joining compound 112 in the surface of bore 102 for shrink fit tool holder 100, other methods can also be used. Extreme super-cooling of tool holding section 108 can also be used. In this manner, the inner diameter of bore 102 shrinks from the excessive cooling and then expands rapidly when it is removed from the cooling medium.

Joining compound 112 can also be embedded in the surface of bore 102 with extreme force by pressing joining compound 112 into the surface of bore 102.

Figure 3:
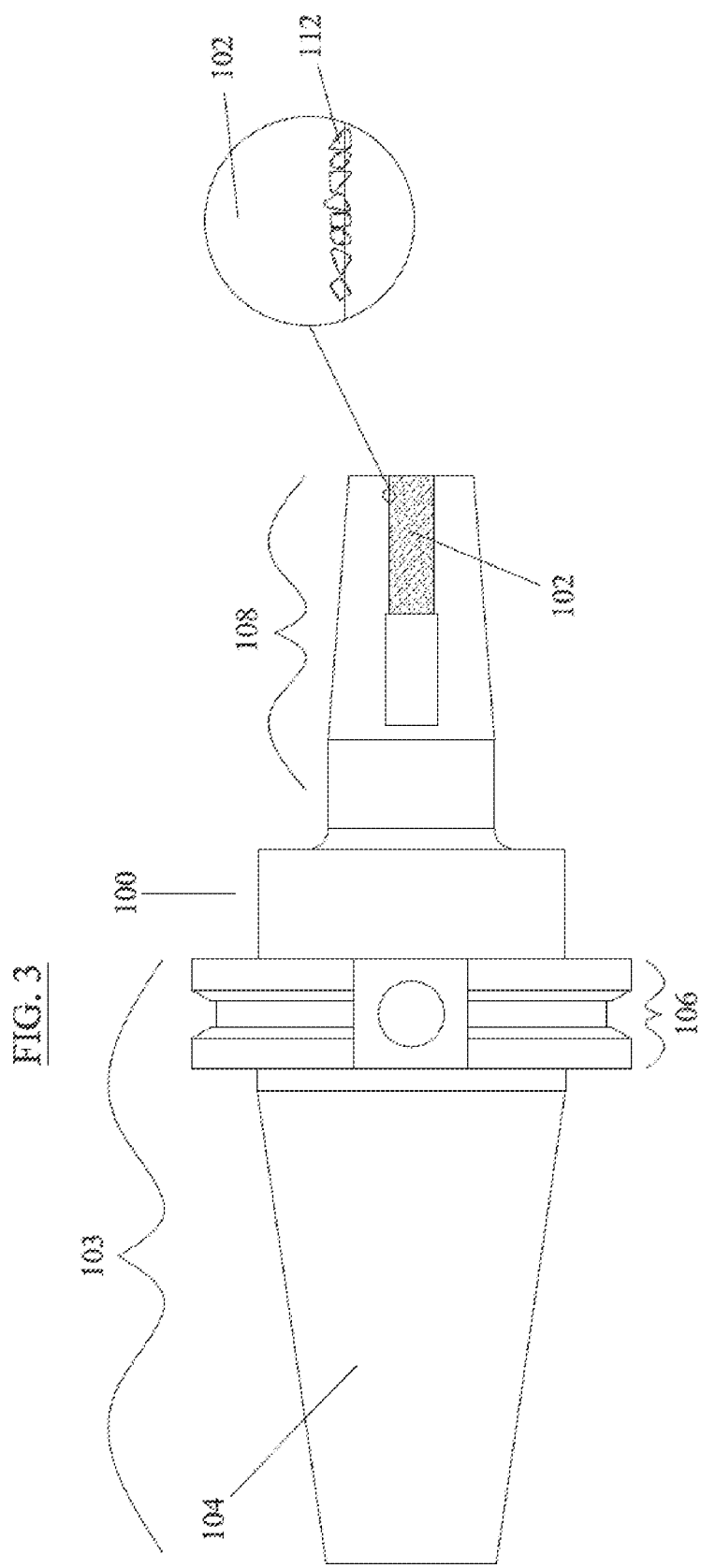
FIG. 3 is a partial cross-sectional side view of the tool holder of FIG. 1 with the bore of the tool holder embedded with a joining compound.

FIG. 3 shows tool holder 100 with a tool 110 mechanically locked in bore 102 of tool holding section 108. As shown, the particles of joining compound 112 are partially embedded substantially equally around the surface area of bore 102. After tool holding section 108 has cooled and the inner diameter of bore 102 has shrunk, a mechanical lock occurs between joining compound 112 and tool 110. It has been found that this implementation could provide a grip on tool 110 that is stronger than without joining compound 112. A hydraulic system was built to force the tool from tool holder 100 by pushing from the inside of tool holder 100 on the back end of the tool. These tests indicated a 400% improvement over a carbide tool in an untreated tool holder 100 before being impregnated by joining compound 112 comprised of diamond.

In addition to the foregoing, tool holder 100 impregnated by joining compound 112 has several other advantages over the prior art. Tool holder 100 that are manufactured with a size of bore 102 that is on the smaller size is difficult to manufacture with tight tolerances. By impregnating bore 102 with joining compound 112 looser tolerances are tolerated without incurring slippage of tool 110 during use or difficulty with extracting tool 110 from bore 102. This occurs because the grip on tool 110 is improved by reducing the surface area in bore 102 that is in contact with tool 110. Tool 110 is held by millions of diamond points that cause the surface of the shank of tool 110 to undergo elastic deformation. This occurs without any significant change in the concentricity of bore 102. As a result the tool 110 is less prone to slippage during use, which leads to a decrease in damage to workpieces.

It should also be noted that when 110 is difficult to extract from bore 102, operators tend to overheat tool holder 100 to try to increase the expansion of bore 102. This can cause permanent damage to tool holder 100. Diamond impregnated tool holders will reduce the number of tool holders damaged by overheating, by providing improved extractability.

Resistance to abrasion is also improved which increases the durability of bore 102. Most anything contacting the surface of bore 102 will be contacting only joining compound 112. This also means that there is virtually no metal to metal contact between the inner diameter surface of bore 102 and the shank of tool 110, which reduces galding of bore 102 or the shank of tool 110. Works well when tool 110 is made from either high strength steel (HSS) or WC.

Tool holder 100 may have some discoloration caused by the heating during the impregnation process herein described. This discoloration can be removed easily with a polishing process. Another solution, however, is to use a slightly undersized applicator 114 that requires less heat to extract and cooling the tool holder with liquid nitrogen, before the extraction. Another solution is to block the access of oxygen from the surface of the tool holder while it is being heated or using an inert gas or high temperature grease.

Figure 6:
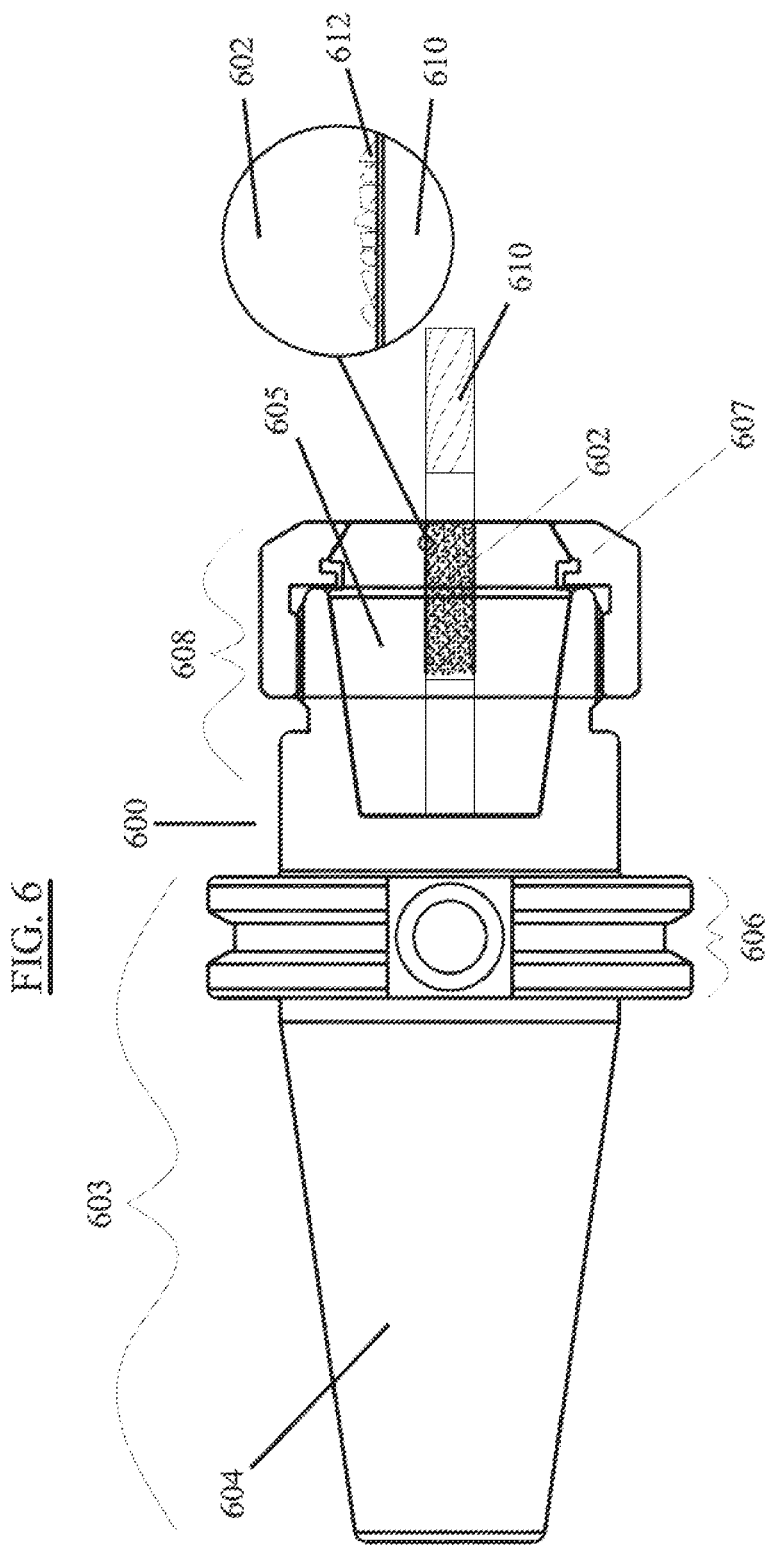
FIG. 6 is a partial cross-sectional side view of a tool holder with a collet.

The foregoing method can be applied to any type of tool holder. FIG. 6 is a partial cross-sectional side view of a tool holder 600 with a collet 605. Tool holder 600 includes a first section 603 adapted to be connected to a machining center (CNC). This first section 603 can include a tapered connecting portion 604 configured to be received by a CNC machine (not shown) and a manipulator-engaging portion 606 is designed to be engaged by a clamping system in the CNC machine to hold firmly tool holder 600 to the CNC machine spindle. A tool holding section 608 that includes collet 605 and a nut 607 can firmly hold a tool 610 to the tool holder 600. A shank of the tool is inserted into bore 602 of collet 605 of tool holding section 608 and secured by tightening nut 607. In this implementation, bore 602 of collet 605 is coated with joining compound 612 using an applicator 114. Instead of heating tool holding section 608, the surface of bore 602 can be impregnated with joining compound 612 by clamping pressure of collet 605 onto applicator 114 with sufficient pressure to penetrate the surface, typically in excess of 5000 psi depending on the material. Then, when tool holder 600 is ready for use, nut 607 is loosened, the excess joining compound 112 is washed out of bore 602 and tool 610 is inserted. Similar to the foregoing implementation, joining compound 612 increases the coefficient of static friction between tool holder 600 and the tool 610.

Figure 7:
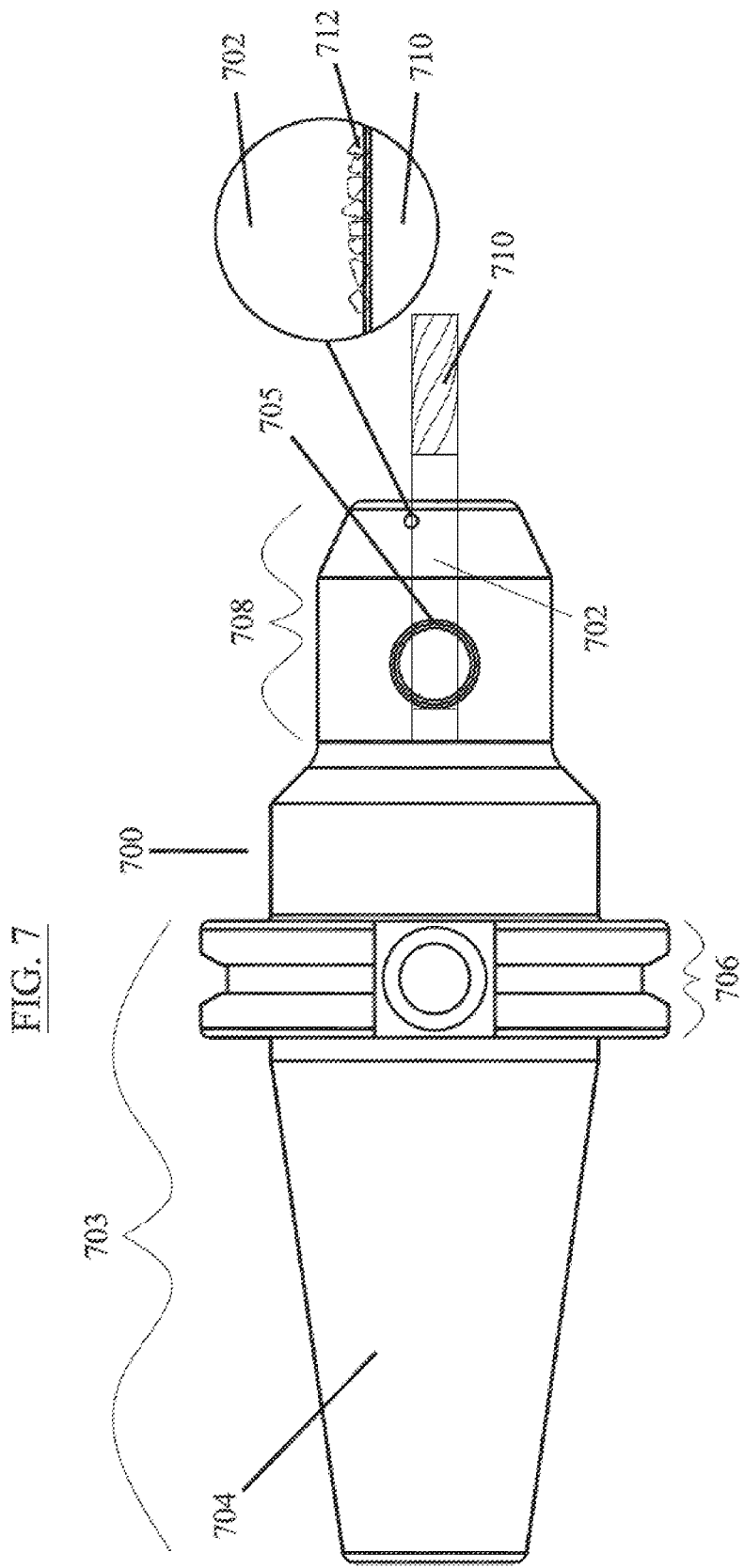
FIG. 7 is a partial cross-sectional side view of an end mill tool holder.

FIG. 7 is a partial cross-sectional side view of an end mill style tool holder 700. Tool holder 700 includes a first section 703 adapted to be connected to a machining center (CNC). This first section 703 can include a tapered connecting portion 704 configured to be received by a CNC machine (not shown) and a manipulator-engaging portion 706 is designed to be engaged by a clamping system in the CNC machine to hold firmly tool holder 700 to the CNC machine spindle. A tool holding section 708 that includes a set screw 705 in a threaded bore can firmly hold a tool 710 to the tool holder 700. A shank of the tool is inserted into bore 702 of tool holding section 708 and secured by tightening set screw 705. In this implementation, bore 702 is coated with joining compound 712 using an applicator 114. Similar to the shrink fit implementation discussed above, tool holding section 708 is heated, and while bore 702 is expanded it is coated with joining compound 712 by applicator 114 and the bore returns to its normal size and secures applicator 114 to tool holding section 708 and impregnates the inner surface of bore 702 with joining compound 712. Similar to the foregoing implementations, joining compound 712 increases the coefficient of static friction between tool holder 700 and tool 710.

Figure 8:
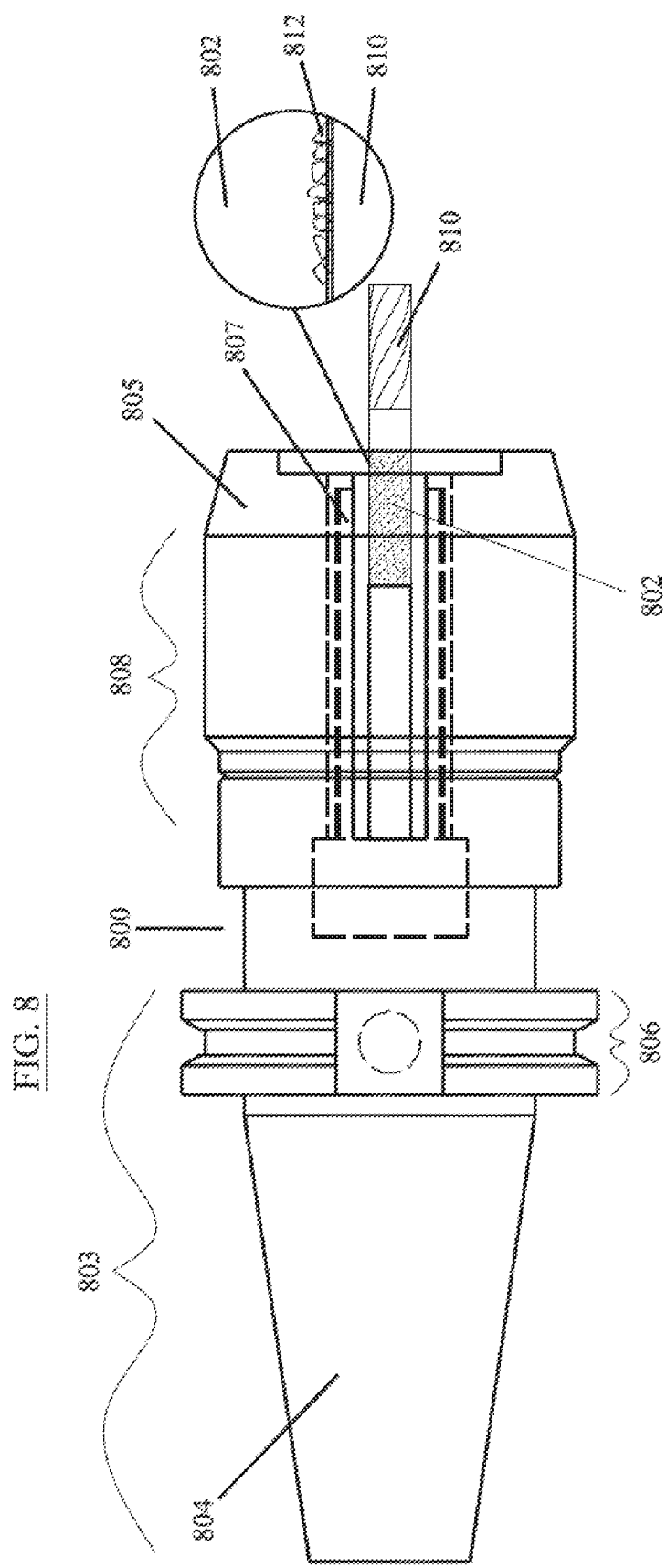
FIG. 8 is a partial cross-sectional side view of a milling tool holder.

FIG. 8 is a partial cross-sectional side view of a milling-type tool holder 800. Tool holder 800 includes a first section 803 adapted to be connected to a machining center (CNC). This first section 803 can include a tapered connecting portion 804 configured to be received by a CNC machine (not shown) and a manipulator-engaging portion 806 is designed to be engaged by a clamping system in the CNC machine to hold firmly tool holder 800 to the CNC machine spindle. A tool holding section 808 that includes an outer portion 805 that screws onto an inner portion 807 to tighten onto tool 810. A shank of the tool is inserted into bore 802 of tool holding section 708 and secured by tightening outer portion 805 onto inner portion 807. In this implementation, bore 802 of inner portion 807 is coated with joining compound 812 using an applicator 114. Similar to the collet-implementation discussed above, instead of heating tool holding section 708, the surface of bore 702 can be impregnated with joining compound 712 by clamping pressure of inner portion 807 onto applicator 114 with sufficient pressure to penetrate the surface, typically in excess of 5000 psi depending on the material. Then, when tool holder 700 is ready for use, outer portion 705 is loosened, the excess joining compound 712 is washed out of bore 702 and tool 710 is inserted. Similar to the foregoing implementations, joining compound 712 increases the coefficient of static friction between tool holder 700 and the tool 710.

Figure 9:
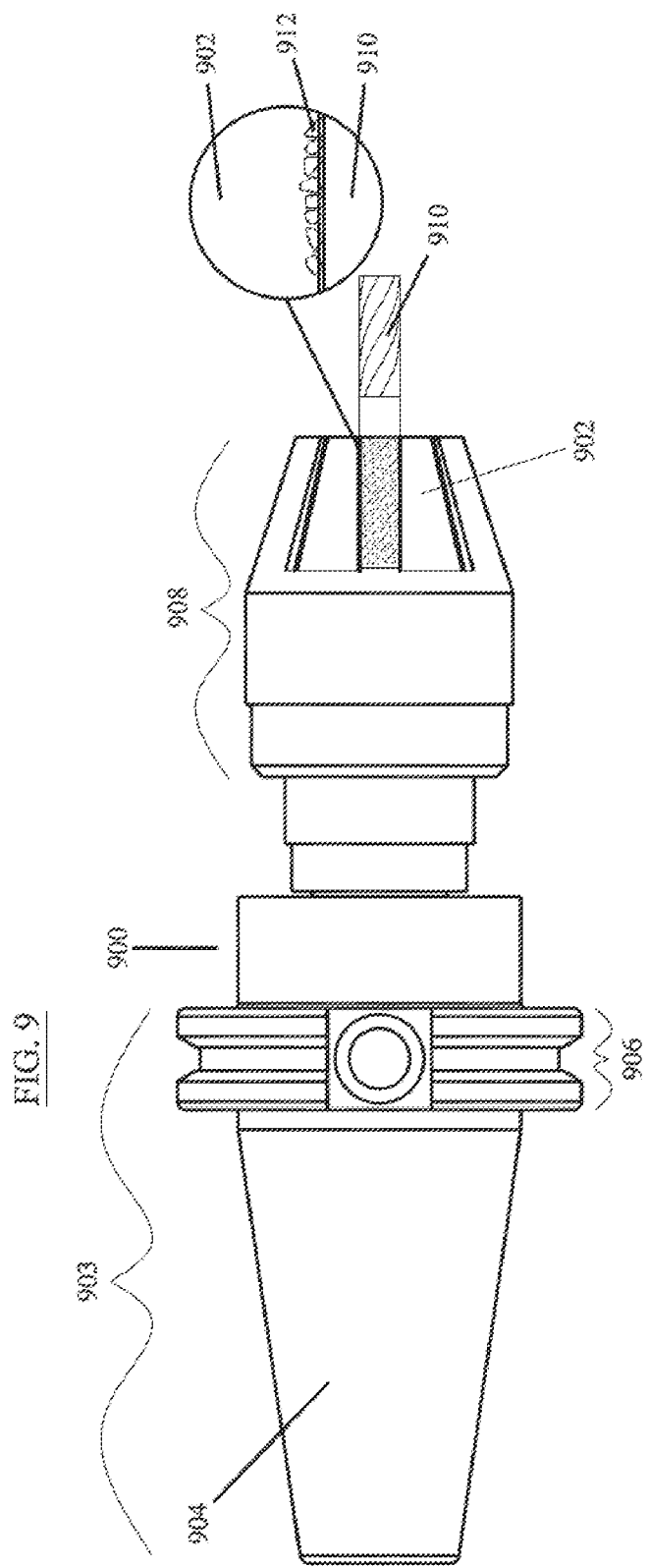
FIG. 9 is a partial cross-sectional side view of a drill chuck type tool holder.

FIG. 9 is a partial cross-sectional side view of a drill chuck-type tool holder 900. Tool holder 900 includes a first section 903 adapted to be connected to a machining center (CNC). This first section 903 can include a tapered connecting portion 904 configured to be received by a CNC machine (not shown) and a manipulator-engaging portion 906 is designed to be engaged by a clamping system in the CNC machine to hold firmly tool holder 900 to the CNC machine spindle. A tool holding section 908 includes multiple jaws 902 that are loosened and tightened by the rotation of tool holding section 908. A shank of the tool is inserted in between jaws 902 of tool holding section 908 and secured by tightening tool holding section 908. In this implementation, a bore comprises clamping surfaces of jaws 902 which are coated with joining compound 912 using an applicator 114. Similar to the collet-implementation discussed above, instead of heating tool holding section 908, the inner surface of jaws 902 constituting the bore can be impregnated with joining compound 912 by clamping pressure of the inner surface of jaws 902 onto applicator 114 with sufficient pressure to penetrate the surface, typically in excess of 5000 psi depending on the material. Then, when tool holder 900 is ready for use, tool holding section 908 is loosened, the excess joining compound 912 is washed out and tool 910 is inserted in the usual manner. Similar to the foregoing implementations, joining compound 912 increases the coefficient of static friction between tool holder 900 and the tool 910.

Figure 10:
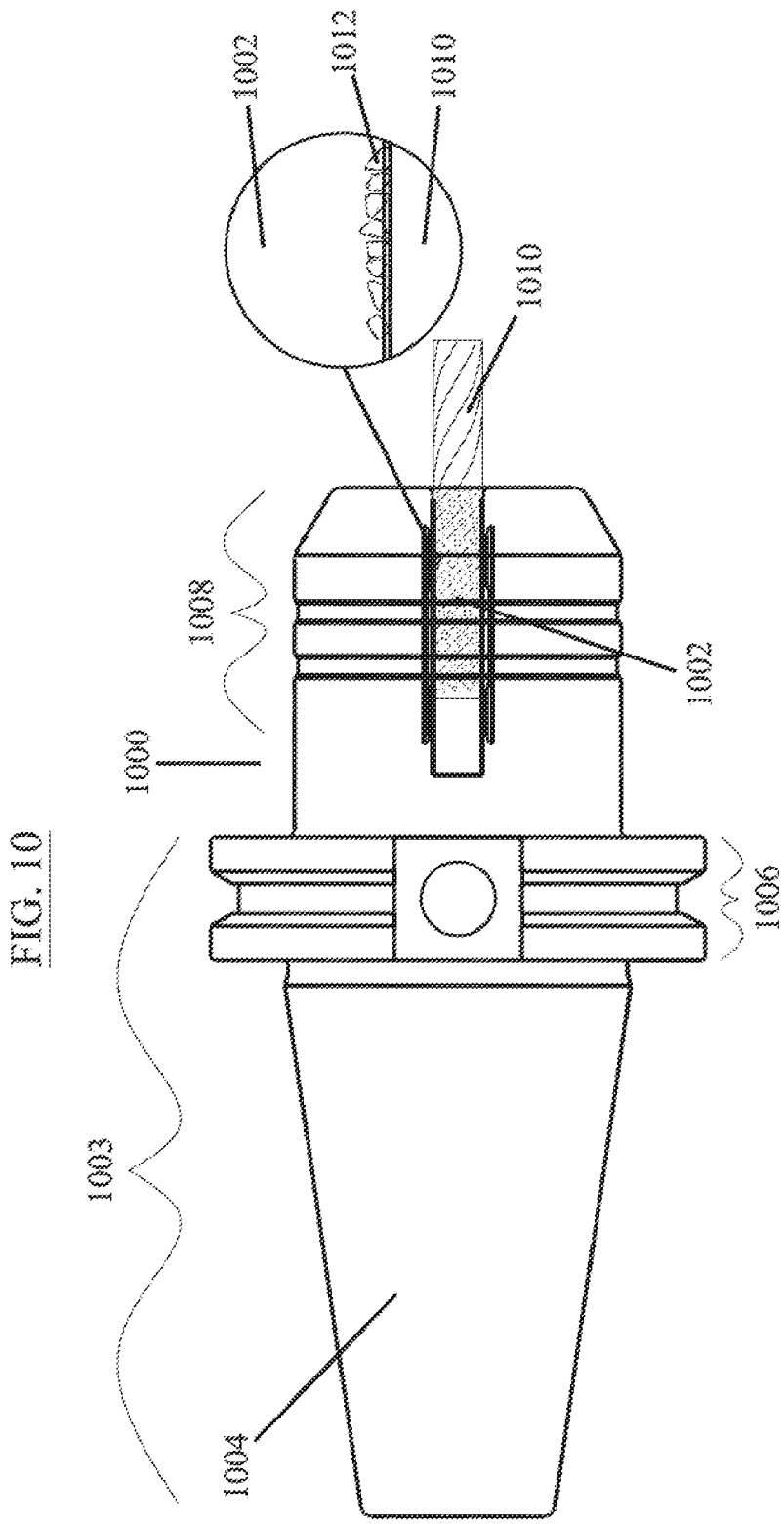
FIG. 10 is a partial cross-sectional side view of a hydraulic type tool holder.

FIG. 10 is a partial cross-sectional side view of a hydraulic-type tool holder 1000. Tool holder 1000 includes a first section 1003 adapted to be connected to a machining center (CNC). This first section 1003 can include a tapered connecting portion 1004 configured to be received by a CNC machine (not shown) and a manipulator-engaging portion 1006 is designed to be engaged by a clamping system in the CNC machine to hold firmly tool holder 1000 to the CNC machine spindle. A tool holding section 1008 includes a set screw that pushes a plunger into an oil reservoir. With nowhere for the oil to go, the oil exerts force on the thinner wall area around a bore 1002. This causes the wall of bore 1002 to bulge and grip the shank of tool 1010. In this implementation, bore 1002 is coated with joining compound 1012 using an applicator 114. Similar to the shrink fit implementation discussed above, tool holding section 1008 is heated, and while bore 1002 is expanded it is coated with joining compound 1012 by applicator 114 and the bore returns to its normal size and secures applicator 114 to tool holding section 1008 and impregnates the inner surface of bore 1002 with joining compound 1012. Similar to the foregoing implementations, joining compound 1012 increases the coefficient of static friction between tool holder 1000 and tool 1010.

Figure 5:
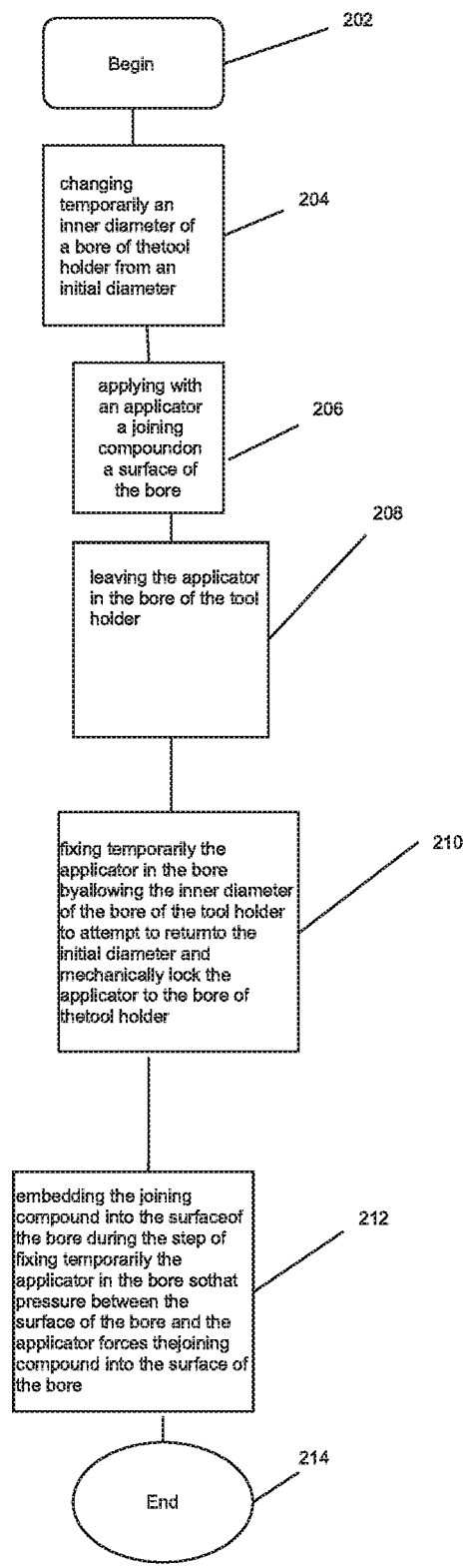
FIG. 5 is a flow chart for carrying out the method of embedding the bore of the tool holder with the joining compound.

The methods herein described can be carried out in reference to FIG. 5. The method begins at step 202 and proceeds to changing temporarily an inner diameter of a bore of the tool holder from an initial diameter at step 204. The method continues by applying with an applicator a joining compound on a surface of the bore at step 206 and leaving the applicator in the bore of the tool holder at step 208. The method continues by fixing temporarily the applicator in the bore by allowing the inner diameter of the bore of the tool holder to attempt to return to the initial diameter and mechanically lock the applicator to the bore of the tool holder at step 210 and then to embedding the joining compound into the surface of the bore during the step of fixing temporarily the applicator in the bore so that pressure between the surface of the bore and the applicator forces the joining compound into the surface of the bore at step 212. The method ends at step 214. Additional steps and further details are more particularly described in the claims. The steps of impregnating the surface of bore 102 with joining compound 112 can be done manually by manipulating applicator 114 by hand. This step could also be automated to reduce the amount of human intervention.

The joining compound referred to in each implementation has the same meaning as given in the first implementation of joining compound 112. Those skilled in the art will recognize that the implementations described herein have lots of variables that change the amount of pressure required to embed joining compound 112 into the surface of the bore. These variables include the Bore diameter where larger bores have larger surface areas and will require more force to penetrate the surface with joining compound. Bores that have a longer length have a larger surface area and will require more force. The particle size of joining compound 112 is also a variable where larger particles will require more force. The harder bore materials will require more force. The number of particles in a given area is also a variable. Less spacing between the particles will require more force. Finally, bore finish is a variable where a smoother bore might require more force.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A tool holder for holding a tool having a shank with an outer diameter, the tool holder comprising:
    a first section adapted to be connected to a machining center and a tool holding section comprising a bore having a surface defining an inner diameter of the bore and having dispersed around the surface of the bore and at least partially embedded in the surface of the bore a joining compound having a Young's modulus greater than a Young's modulus of the surface of the bore; and
    an applicator fixed temporarily in the bore of the tool holder with the surface of the bore in a state of stress from heating the tool holder to expand the bore and allowing the bore to cool onto the applicator which causes a forceful application of the joining compound into the surface of the bore.

2. The tool holder of claim 1, wherein the joining compound is partially embedded into the surface of the bore by plastic deformation of the surface of the bore.

3. The tool holder of claim 2, wherein the joining compound comprising a particle size greater than or equal to a difference between the inner diameter of the bore and the outer diameter of the shank of the tool.

4. The tool holder of claim 3, wherein the joining compound comprises a particle structure.

5. The tool holder of claim 3, wherein the joining compound comprises a hardness greater than a hardness of the surface of the bore of the tool holding section of the tool holder.

6. The tool holder of claim 5, wherein the joining compound are selected from a group comprising diamond, aluminum oxide, silicon carbide, boron carbide, synthetic sapphire, garnet, cerium oxide, silica, and osmium.

7. The tool holder of claim 2, and further comprising an applicator for embedding the joining compound into the surface of the bore of the tool holding section of the tool holder with a Rockwell hardness greater than a Rockwell hardness of the surface of the bore of the tool holding section of the tool holder.

8. A tool holder for holding a tool having a shank with an outer diameter, the tool holder comprising:
    a first section adapted to be connected to a machining center; and
    a tool holding section comprising a bore having undergone a temporary change in an inner diameter; and
    a joining compound having been applied to a surface of the bore by an applicator while the inner diameter of the bore was temporarily changed and embedded in the bore by pressure between the surface of the bore and the applicator when the bore returned to its initial diameter.

9. The tool holder of claim 8, wherein the tool holder has been heated to expand the inner diameter of the bore and allowed to return to its initial diameter.

10. The tool holder of claim 9, wherein the joining compound comprises a particle size greater than or equal to a difference between the inner diameter of the bore minus an outer diameter of a shank of the tool.

11. The tool holder of claim 10, wherein the joining compound comprises a particle structure.

12. The tool holder of claim 11, wherein the joining compound comprises a hardness greater than a hardness of the surface of the bore.

13. The tool holder of claim 12, wherein the joining compound comprises diamond.

14. The tool holder of claim 12, wherein the bore of the tool holder was heated to a temperature that causes sufficient expansion of the inner diameter of the bore to insert the applicator before return to its initial diameter.

15. The tool holder of claim 8, wherein the joining compound is at least partially embedded in the surface of the bore.

16. The tool holder of claim 8, wherein the joining compound has a Young's modulus greater than a Young's modulus of a surface of the bore, wherein the joining compound comprising a particle size greater than or equal to a difference between the inner diameter of the bore and the outer diameter of the shank of the tool holder, and, wherein the joining compound comprises a hardness greater than a hardness of the surface of the bore of the tool holding section of the tool holder.

17. The tool holder of claim 8, wherein the joining compound are selected from a group comprising diamond, aluminum oxide, silicon carbide, boron carbide, synthetic sapphire, garnet, cerium oxide, silica, and osmium.

\* \* \* \* \*